(12) United States Patent
Fellague et al.

(10) Patent No.: US 11,371,478 B2
(45) Date of Patent: Jun. 28, 2022

(54) SYSTEMS AND METHODS FOR A FUEL DELIVERY MODULE HELMET OF HYBRID VEHICLE

(71) Applicant: Ford Global Technologies, LLC, Dearborn, MI (US)

(72) Inventors: Nour-Eddine Fellague, Windsor (CA); Harish Dutt, Canton, MI (US); Sean Timothy Ryan, Farmington Hills, MI (US); Peyman Aghssa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 771 days.

(21) Appl. No.: 15/921,591

(22) Filed: Mar. 14, 2018

(65) Prior Publication Data

US 2019/0285031 A1    Sep. 19, 2019

(51) Int. Cl.
*F02M 37/00* (2006.01)
*B60K 15/063* (2006.01)

(52) U.S. Cl.
CPC ....... *F02M 37/0011* (2013.01); *B60K 15/063* (2013.01); *F02M 37/007* (2013.01); *B60K 2015/0634* (2013.01); *F02M 37/0076* (2013.01); *Y10S 903/951* (2013.01)

(58) Field of Classification Search
CPC .............. F02M 37/007; F02M 37/103; F02M 37/0011; F02M 37/0076; F02M 2200/185; B60K 15/063; B60K 15/03; B60K 15/073; B60K 6/20; B60K 2015/03328; B60K 2015/03032; B60K 2015/0634; B60K 2015/03243; B60K 2015/03467; H01R 13/53; H01R 13/533; H01R 13/52

See application file for complete search history.

(56) References Cited

U.S. PATENT DOCUMENTS

| | | | | |
|---|---|---|---|---|
| 2,201,521 A | * | 5/1940 | Cook | B65D 90/10 220/725 |
| 4,880,134 A | * | 11/1989 | Wood, Jr. | F17C 13/06 220/724 |
| 5,207,463 A | * | 5/1993 | Seizert | B60K 15/01 220/298 |

(Continued)

FOREIGN PATENT DOCUMENTS

| | | |
|---|---|---|
| EP | 2628937 A2 | 8/2013 |
| JP | 11078548 A * | 3/1999 |

OTHER PUBLICATIONS

Art Hedrick, Die Basics 101: Bending methods—Wipe, coin relief, pivot, V bending, Aug. 8, 2007, The Fabricator, retrieved Feb. 29, 2020 from https://www.thefabricator.com/thefabricator/article/stamping/die-basics-101-bending-methods-wipe-coin-relief-pivot-v-bending. (Year: 2007).*

(Continued)

*Primary Examiner* — Steve Clemmons
(74) *Attorney, Agent, or Firm* — Vincent Mastrogiacomo; McCoy Russell LLP

(57) ABSTRACT

Methods and systems are provided for protective cover. In one example, the protective cover may be configured to protect a fuel delivery module and may include a domed cap. The domed cap may resistant forces exerted on the protective cover and maintain clearance between the domed cap and enclosed electronic ports of the fuel delivery module.

20 Claims, 9 Drawing Sheets

(56) References Cited

U.S. PATENT DOCUMENTS

| | | | | |
|---|---|---|---|---|
| 7,392,782 | B2* | 7/2008 | Fujii | F02M 35/10144 123/195 C |
| 8,413,496 | B2* | 4/2013 | Eslami | G01L 19/003 73/114.43 |
| 8,556,016 | B2* | 10/2013 | Yoda | B60K 6/48 180/68.5 |
| 8,662,573 | B2* | 3/2014 | Vantrease | B62D 25/06 296/203.03 |
| 8,789,719 | B2* | 7/2014 | Whelan | F02M 37/0076 220/562 |
| 9,114,701 | B2* | 8/2015 | Bostwick | B60K 15/03 |
| 9,731,595 | B2* | 8/2017 | Wolf | B60K 15/03177 |
| 9,789,912 | B1* | 10/2017 | Marchlewski | B62D 33/027 |
| 9,868,408 | B2* | 1/2018 | Ghannam | B60R 16/0239 |
| 9,897,056 | B1* | 2/2018 | Kimball | F02M 59/44 |
| 9,923,179 | B2* | 3/2018 | Maguire | H01M 10/0481 |
| 9,975,440 | B1* | 5/2018 | Song | B60L 11/1818 |
| 10,279,678 | B2* | 5/2019 | Mushiga | F02M 39/005 |
| 10,486,514 | B2* | 11/2019 | Takayanagi | H01M 2/1077 |
| 2004/0021271 | A1 | 2/2004 | Tratnik | |
| 2005/0194796 | A1 | 9/2005 | Powell | |
| 2006/0081395 | A1* | 4/2006 | Motoda | F02M 37/103 174/151 |
| 2007/0012501 | A1* | 1/2007 | Frank | B60K 15/01 180/232 |
| 2007/0039963 | A1* | 2/2007 | Krentz | B60K 15/0406 220/298 |
| 2008/0035120 | A1* | 2/2008 | Sone | F02M 37/103 123/509 |
| 2008/0196957 | A1* | 8/2008 | Koike | B60K 1/04 180/68.5 |
| 2012/0187131 | A1 | 7/2012 | Claucherty | |

OTHER PUBLICATIONS

"Strength of Domes," electroinically retrieved Aug. 14, 2020 from http://www.DiscoverE.org/content/strength-domes, PDF creation dated Aug. 30, 2016 (Year: 2016).*

* cited by examiner

SYSTEMS AND METHODS FOR A FUEL DELIVERY MODULE HELMET OF HYBRID VEHICLE

FIELD

The present description relates generally to methods and systems for configuring a fuel delivery module with a helmet as a barrier to contact with other vehicle components.

BACKGROUND/SUMMARY

In the current push to popularize hybrid electric and electric vehicles, overall dimensions of electrically powered passenger vehicle have decreased in order to meet a rising demand for affordable, fuel efficient automobiles. The packaging of vehicle parts within more compact frames may result in a higher likelihood of contact between vehicle parts due to decreased space separating the parts from one another. This may lead to degradation and malfunction of less durable components of the vehicle or components prone to dislodgement.

For example, in hybrid and plug-in hybrid vehicles (HEVs and PHEVs), an interior floor of the passenger cabin may be configured so that there is little clearance between the floor and a fuel tank stored below the floor due to constraints on space. In order to reduce vehicle weight and improve battery life and fuel economy, the fuel tank may be made of lightweight materials such as plastic. The fuel tank may have a fuel transducer module or fuel delivery module (FDM) protruding from a top surface of the tank that is also formed from a lightweight plastic. During occasions where the interior floor may be induced to crumple and slide, the floor may forcefully contact the FDM parts on top of the fuel tank. A resulting displacement of the FDM parts may degrade a wall of the plastic fuel tank, forming cracks or openings.

Other attempts to address the dislocation of the FDM include adapting the FDM with a protective cover. One example approach is shown by Claucherty in U.S. 2012/0187131. Therein, a protective cover assembly is presented comprising a cover body with a plurality of descending legs and a locking ring. The locking ring secures the cover body to the fuel tank via rotational engagement with an encapsulated ring affixed to the fuel tank. The plurality of descending legs elevates a flat top surface of the cover body above electrical components of the fuel transducer module, thereby guarding the fuel transducer module from impact during a collision.

However, the inventors herein have recognized potential issues with such systems. As one example, a force may be exerted in a downwards direction on the flat top surface of the protective cover by a buckling of the interior cabin floor. A resistance of the top surface of the protective cover to the pressure is provided by tensile forces which may not be sufficient to maintain a shape of the protective cover. The top surface of the protective cover may succumb to the force and bend downwards, reducing a clearance between the top surface of the cover and the parts of the FDM externally protruding from the top of the fuel tank and increasing a likelihood of undesirable contact.

In one example, the issues described above may be addressed by a fuel system of a hybrid vehicle, comprising a fuel tank, a fuel delivery module, a portion of the fuel delivery module positioned inside the fuel tank and one or more electronic ports of the fuel delivery module arranged outside of the fuel tank and protruding from a top surface of the fuel tank, and a protective cover surrounding the one or more electronic ports of the fuel delivery module and spaced away from the one or more electronic ports, the protective cover having a domed cap. In this way, the effectiveness of the FDM helmet may be improved without incurring additional cost and weight penalties.

As one example, the FDM helmet may have a domed upper surface that provides a distance between the domed surface and FDM ports enclosed by the helmet that maintains a clearance between the domed surface and a tallest point of the FDM ports even when a downward force is exerted on the FM helmet. By configuring the FDM helmet with a domed shaped, the helmet may be fortified by compressive and shear forces stemming from its shape. Furthermore, an interaction of the dome with moving objects, such as buckling and shifting of an interior cabin floor, may reduce a force of impact to the dome. This may occur as a result of an increased height of the domed FDM helmet that increases a probability that the dome will interact with the moving object. Friction generated by the interaction may decrease a velocity of the moving object, thereby softening an impact experienced by the FDM helmet. Thus a likelihood of degradation of the structural integrity of the fuel tank may be minimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-6 are shown approximately to scale

DETAILED DESCRIPTION

Figure 1:
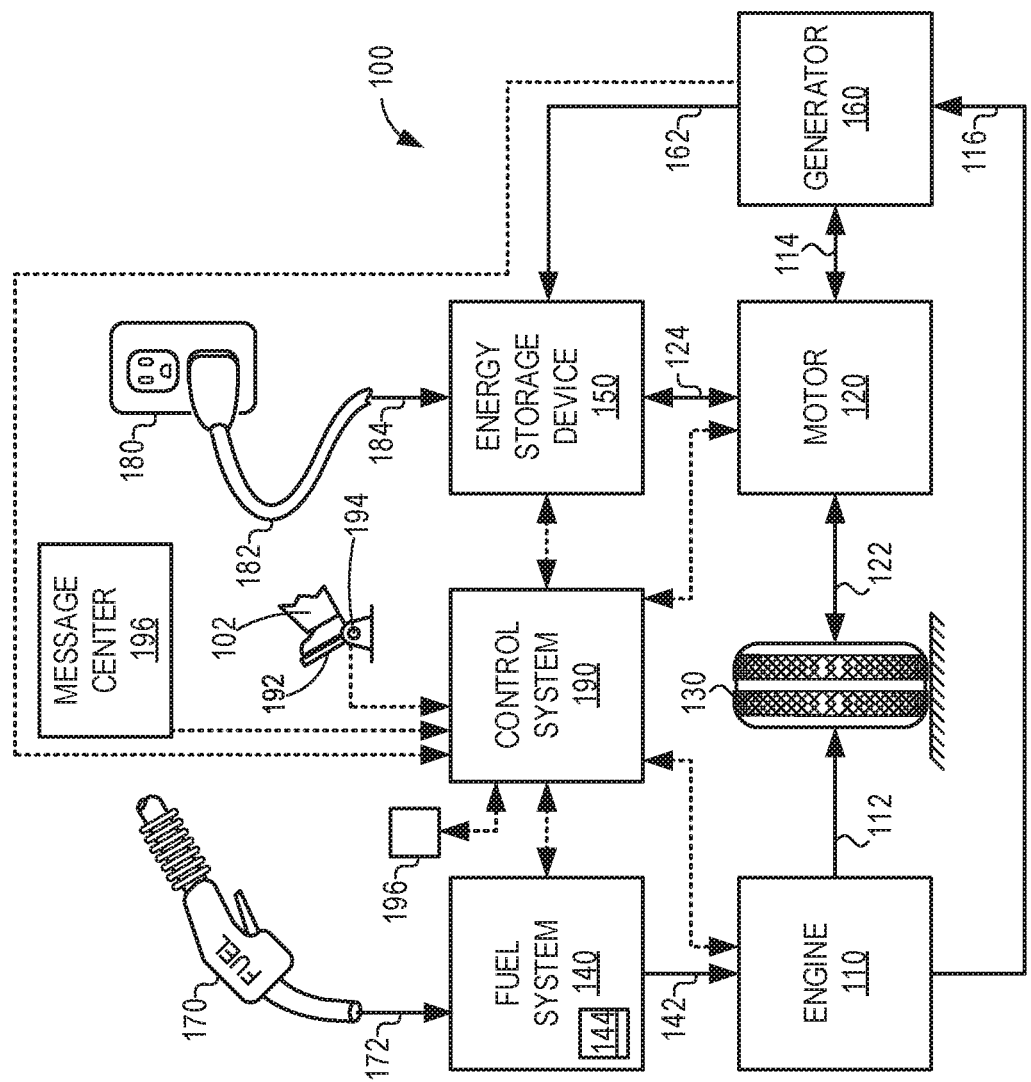
FIG. 1 illustrates an example hybrid vehicle propulsion system including a fuel system with a fuel tank.
Figure 2:
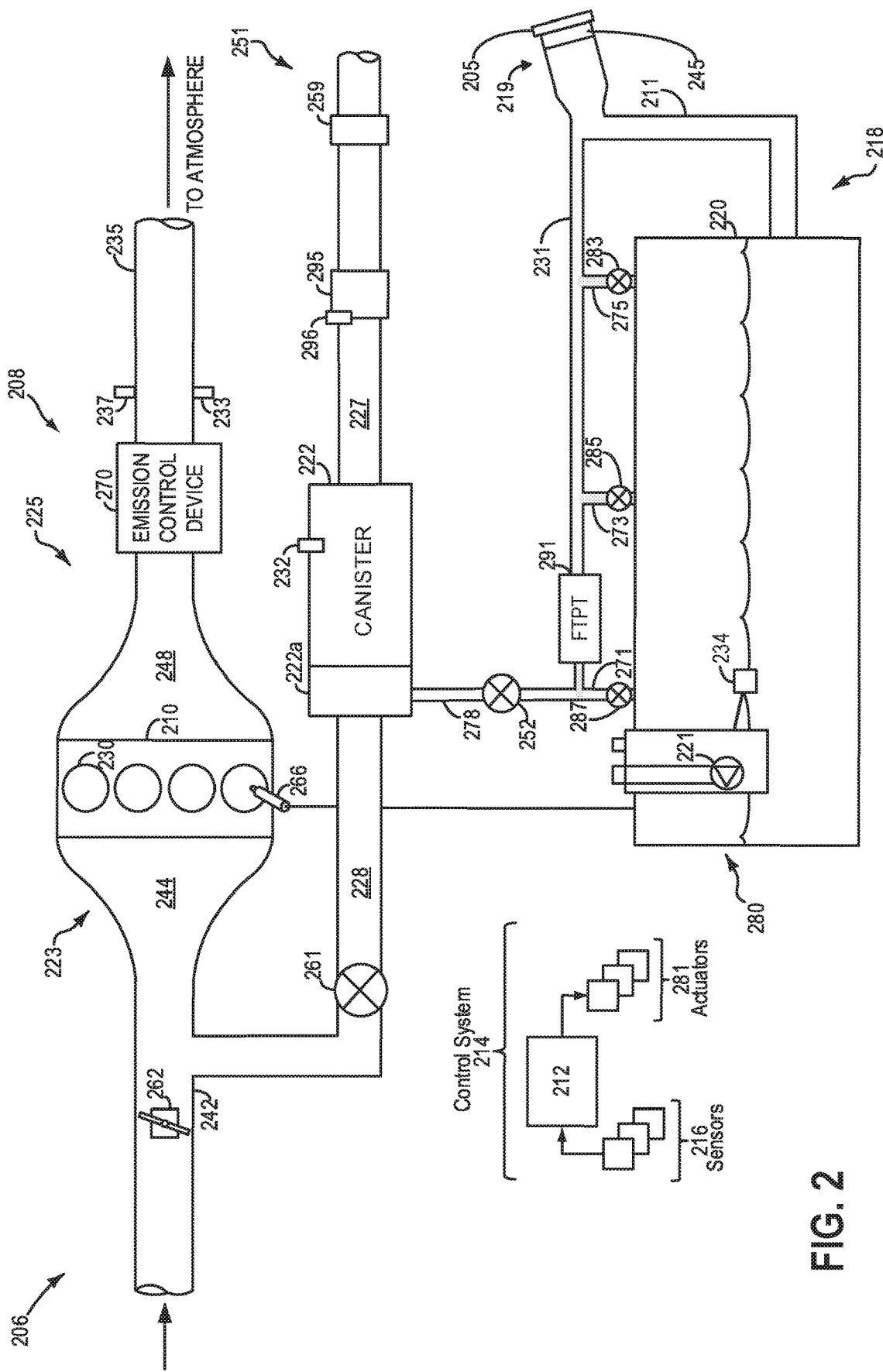
FIG. 2 shows an example vehicle system comprising an engine system coupled to a fuel system and an evaporative emissions system.
Figure 3:
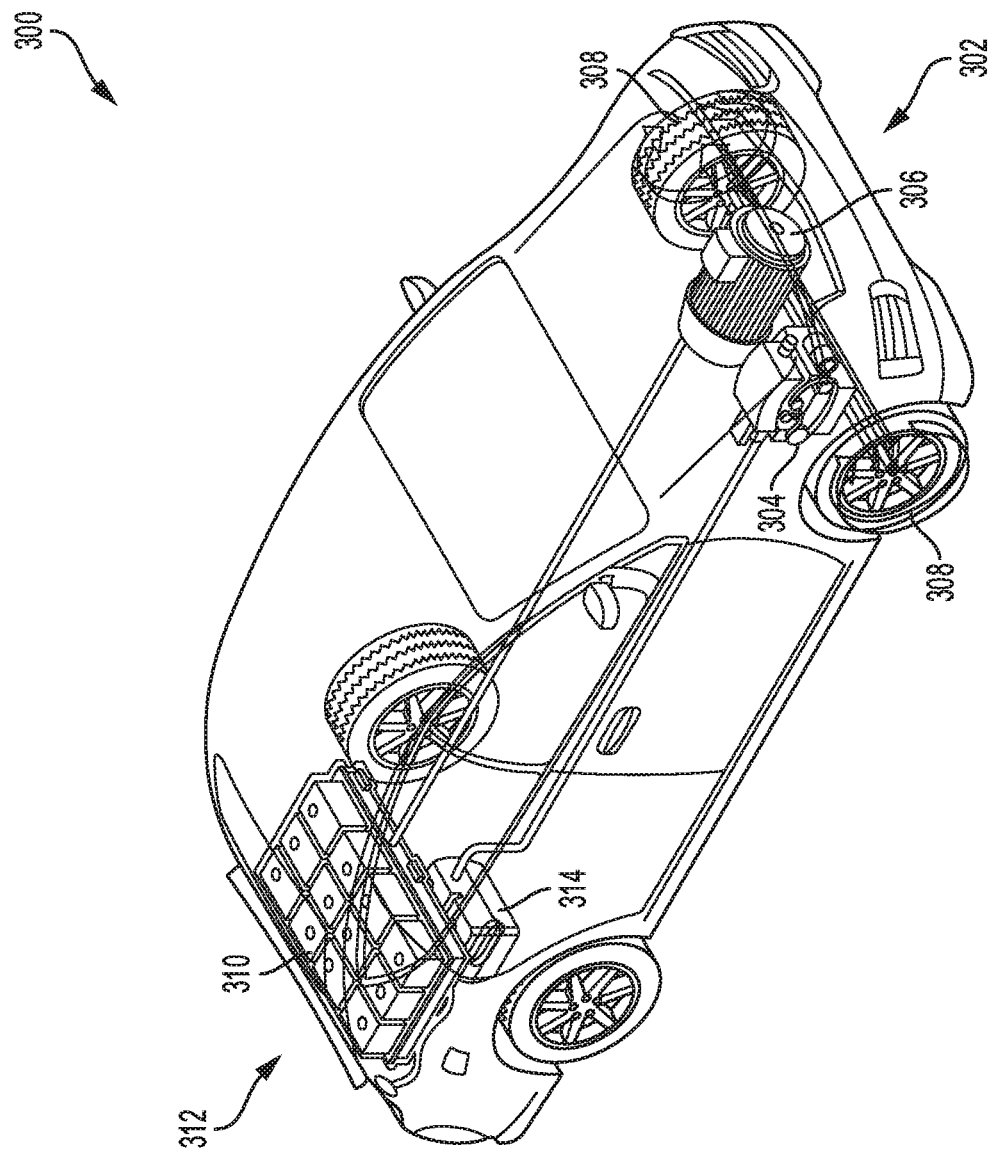
FIG. 3 shows an example of a hybrid electric vehicle and an arrangement of a fuel tank, battery pack, engine, and motor therein.
Figure 4:
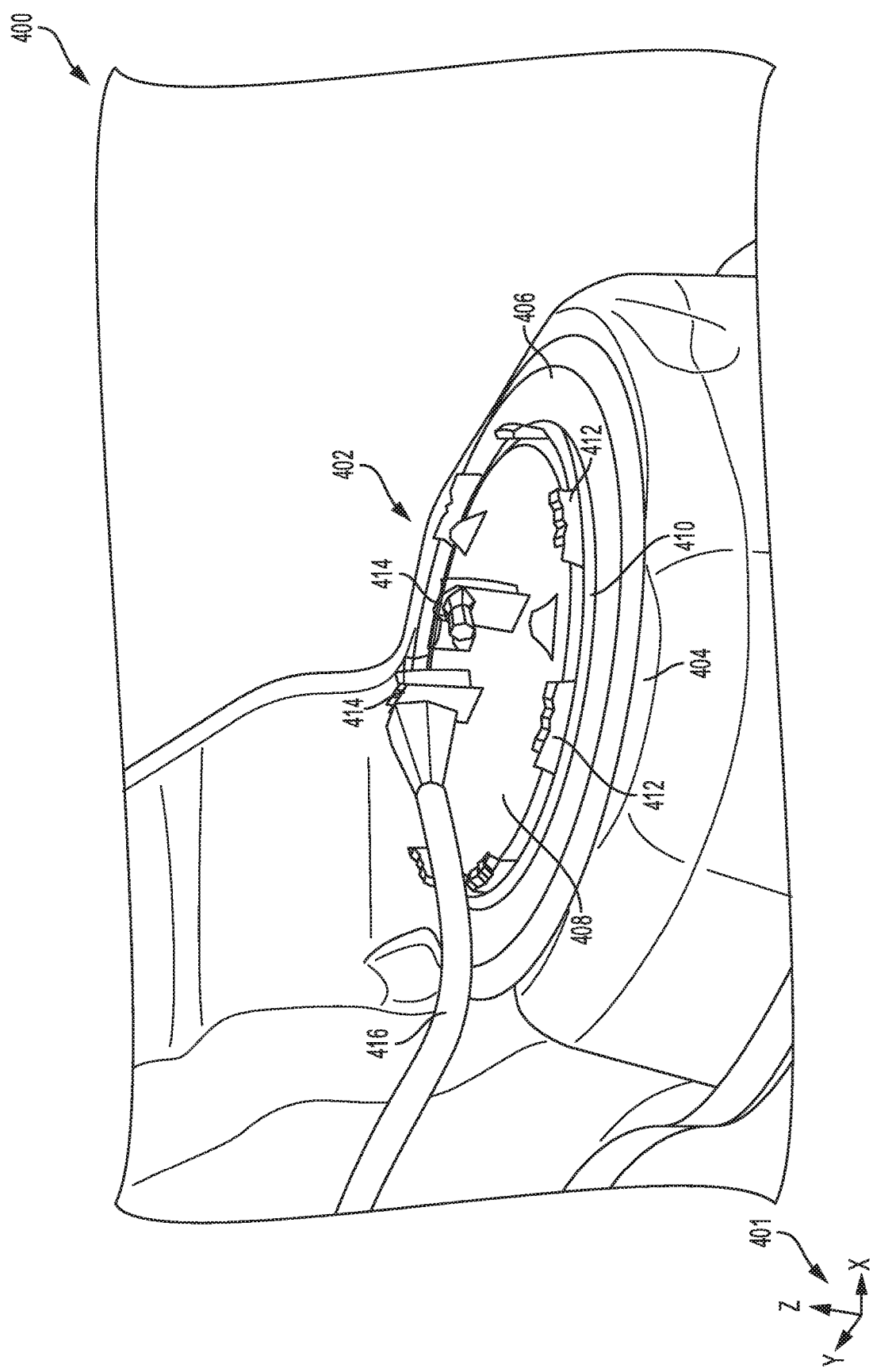
FIG. 4 shows examples of a vehicle fuel tank and outer fuel delivery module components.
Figure 5A:
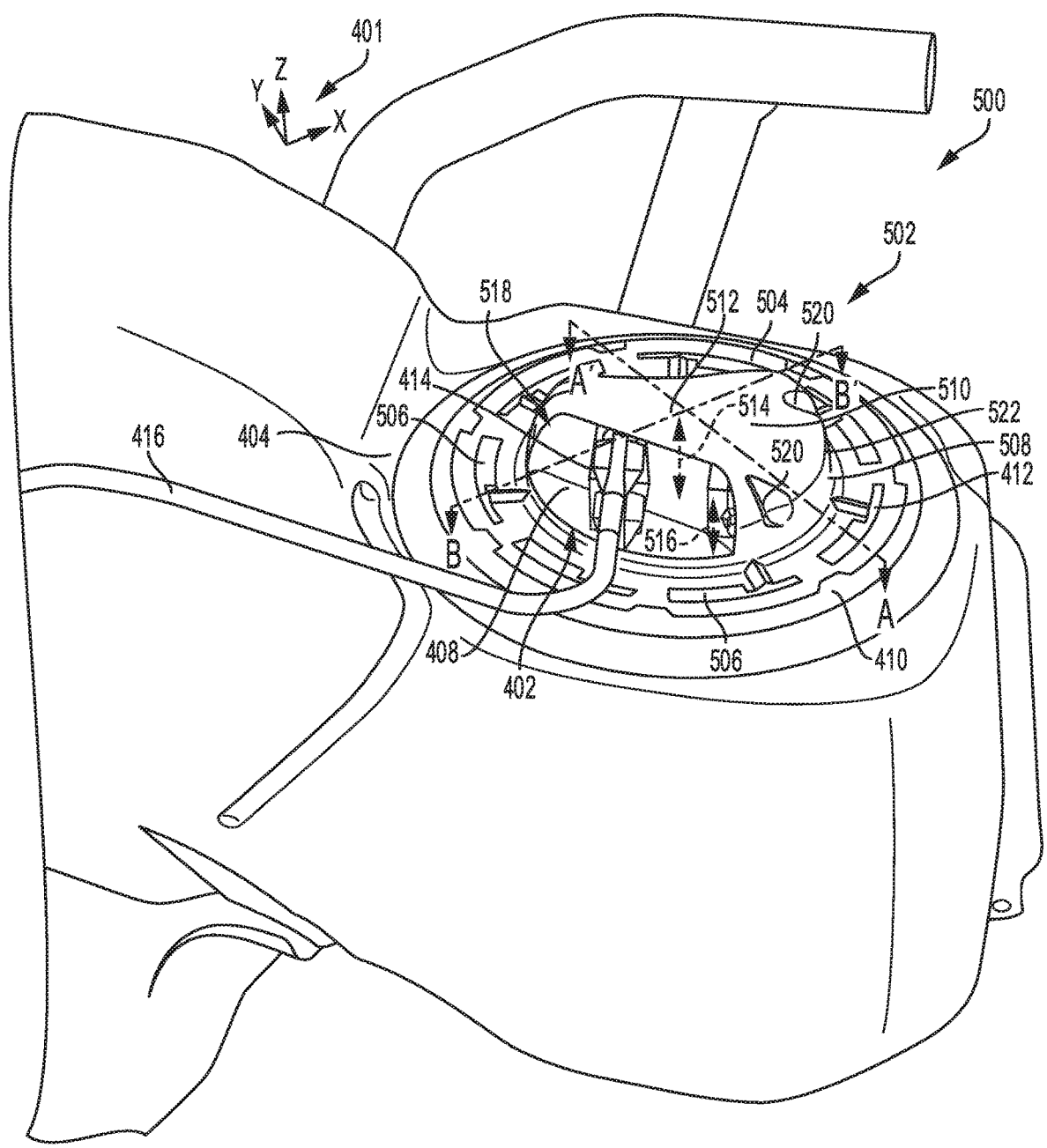
FIG. 5A shows an isometric perspective view of an example of a domed fuel delivery module helmet.
Figure 5B:
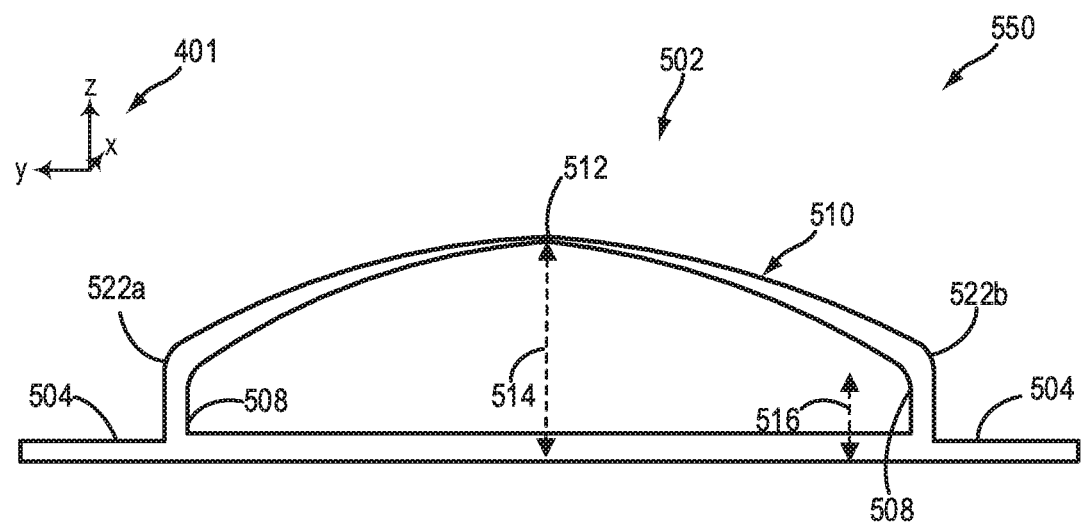
FIG. 5B shows a first cross-section of a domed fuel delivery module helmet.
Figure 5C:
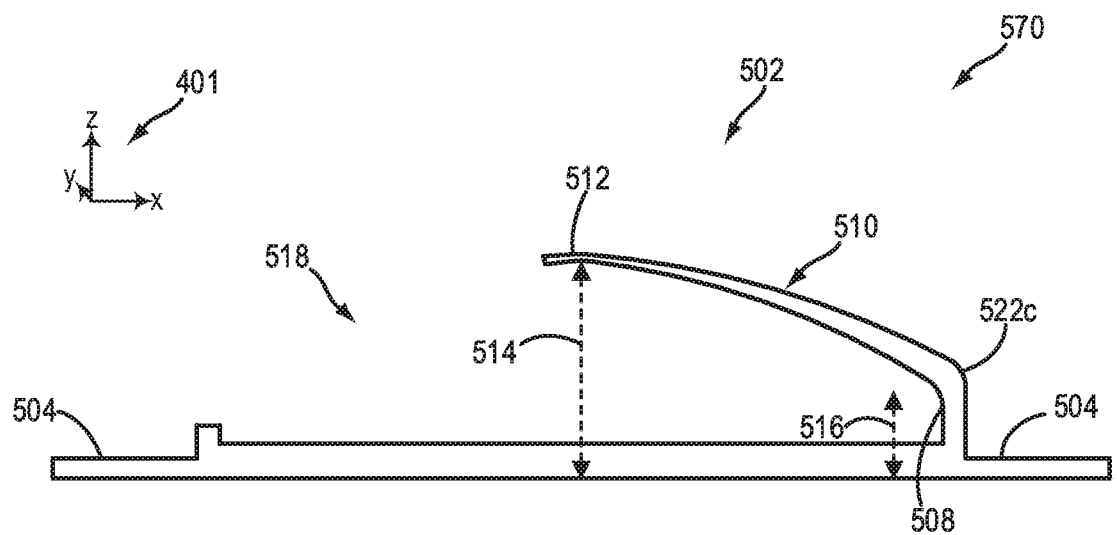
FIG. 5C shows a second cross-section of a domed fuel delivery module helmet.
Figure 6:
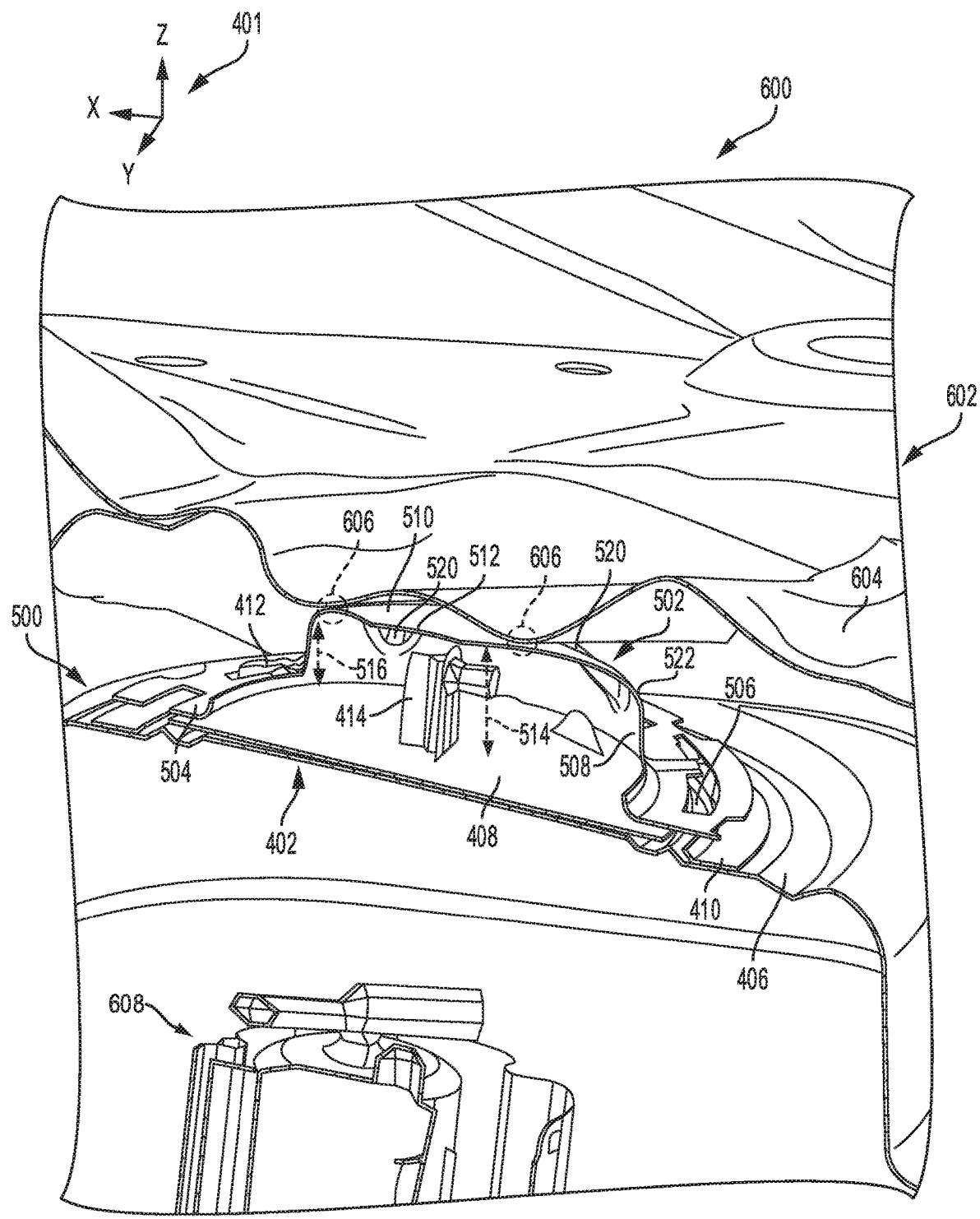
FIG. 6 shows a cross-section of a crumpled vehicle cabin floor in contact with a domed fuel delivery module helmet arranged on a fuel tank surface.

The following description relates to systems and methods for a domed protective cover for a fuel delivery module (FDM). The fuel delivery module may be a component in a hybrid vehicle powered by a combination of fuel and electrical energy. An example of a propulsion system for the hybrid vehicle is shown in FIG. 1. An exemplary fuel system, coupled to an evaporative emissions system and comprising a FDM in a fuel tank of the system, that may be utilized in a vehicle, including the hybrid electric vehicle, is illustrated in FIG. 2. An arrangement of primary drive propulsion components, such as an engine, motor, battery pack, and fuel tank, in a hybrid electric vehicle is shown in FIG. 3. An example of a fuel tank is depicted in FIG. 4, showing an arrangement of exterior components of the FDM protruding from a top surface of the fuel tank. FIG. 5A shows a domed helmet that may be positioned over the FDM on the fuel tank surface to protect the outer components of the FDM. Cross-sections of the domed helmet are shown in FIGS. 5B and 5C along different planes. Another embodiment of a domed helmet is viewed from directly above in FIG. 9 as an example of variations in the number and shapes of openings in an upper surface of the domed helmet. An example of an interaction between the domed helmet and an interior cabin floor of a vehicle is depicted in FIG. 6. Prophetic examples of a downward force exerted on the domed helmet and a distance between the upper surface of the domed helmet and tops of FDM ports as functions of time are plotted in FIGS. 7 and 8, respectively.

A conventional protective helmet for outer components of a FDM protruding from a top surface of a fuel tank, such as electronic ports, may have a flat upper surface elevated above the ports by side walls. During an event where buckling of a cabin floor or floor of a trunk of the vehicle occurs, the floor may forcefully contact the upper surface of the helmet, driving a downward bending of the upper surface towards the tops of the FDM ports. In order to preserve a gap between the tops of the ports and the upper surface, the flat-top helmet may have an initial gap (e.g., helmet height) of 30 mm to minimize the likelihood of undesirable contact between the helmet and the FDM ports upon deformation of the helmet when pressure is applied.

The available packaging space for the protective helmet under the floor, however, often may not accommodate a helmet height of 30 mm. Furthermore, in order for the side walls of the helmet to maintain a desirable level of tensile strength proportional to an increase in height, more material may be used to increase a thickness of the walls accordingly, incurring additional material weight and cost. Similarly, a tensile strength of the upper surface of the flat-top helmet may also be increased by increasing a thickness of a material of the upper surface with the caveat of adding undesirable weight and cost. This issue may be circumvented by using a domed helmet as a protective cover for the FDM as described herein.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may also be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

In other embodiments, electrical transmission cable 182 may be omitted, where electrical energy may be received wirelessly at energy storage device 150 from power source 180, as indicated by arrow 184. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor integrated into a fuel delivery module. The level of fuel stored at fuel tank 144 (e.g. as identified by the fuel level sensor) may be communicated to the vehicle operator, for example, via a fuel gauge or indication lamp indicated at 196. As described herein, engine 110 may be periodically set to a deactivated state where the consumption of fuel at the engine is significantly reduced or discontinued. Where engine 110 is deactivated for extended periods of time, the fuel stored at fuel tank 144 may take a longer time to be depleted by the engine.

FIG. 2 shows a schematic depiction of a vehicle system 206 that may be incorporated in a variety of vehicle types, including hybrid electric vehicles and conventional gasoline vehicles. The vehicle system 206 comprises a fuel system 218 that may be used as the fuel system 140 of FIG. 1. The vehicle system 206 also includes an engine system 208 coupled to an emissions control system 251 and the fuel system 218. Emission control system 251 includes a fuel vapor container or canister 222 which may be used to capture and store fuel vapors. In some examples, vehicle system 206 may be a hybrid electric vehicle system. In one non-limiting example, vehicle system 206 may be included as part of vehicle propulsion system 100 (e.g., engine 210 may be one non-limiting example of engine 110).

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 and a fuel delivery module 280. Fuel delivery module 280 includes a fuel pump system 221 and a fuel level sensor 234. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. The fuel level sensor 234 of the fuel delivery module may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is one non-limiting example of control system 190 of FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel level sensor 234, fuel tank pressure sensor 291 (FTPT), and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 252, fuel pump 221, ELCM vacuum pump (not shown in FIG. 2), and refueling lock 245. The control system 214 may include controller 212. Controller 212 may receive input data from the various sensors, process the input data, and trigger the actuators in response to the processed input data based on instruction or code programmed therein corresponding to one or more routines.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296 (also referred to herein as ELCM PS or canister vent line pressure sensor). Following the applying of vacuum to the fuel system, a change in pressure at the reference orifice (e.g., an absolute change or a rate of change) may be monitored and compared to a threshold. Based on the comparison, a fuel system leak may be diagnosed.

An example of a fuel system, such as fuel system 218 of FIG. 1, may be positioned in a vehicle 300 as shown in FIG. 3. The vehicle 300 may be a hybrid electric vehicle (HEV) powered by a combination of fuel and electric energy. A front end 302 of the vehicle includes an engine block 304 and a motor 306. Motor 306 may be configured to propel vehicle movement via drive wheels 308, as described for motor 120 and drive wheel 130 of FIG. 1, and coupled to a battery pack 310 arranged in a rear end 312 of the vehicle 300 that supplies electrical energy to the motor 306. Engine block 304 may be coupled to a fuel tank 314, positioned at the rear end 312 of the vehicle 300, and configured to receive fuel from the fuel tank 314.

The battery pack 310 may be significantly larger than the fuel tank 314 and may utilize a majority of the available space in the rear end 312 of the vehicle 300. Thus, the more compact fuel tank 314 may be positioned below the battery pack 310, in a compartment below a floor of a passenger cabin of the vehicle 300. Alternatively, the fuel tank 314 may be disposed below a bottom surface of a vehicle trunk, depending on a geometry of the vehicle. Thus a top surface of the fuel tank 314 may be spaced away from a bottom surface of the cabin floor or trunk by a relatively small distance. During events where the floor or bottom surface of the trunk may shift and buckle, the movement may forcefully drive sections of the floor, or the trunk's bottom surface, in a downwards direction and contact the top surface of the fuel tank 314.

A fuel delivery module (FDM), such as the fuel delivery module 280 of FIG. 2, may be included in the fuel tank 314. The FDM may be an assembly comprising a fuel pump and a fuel level float that are contained within an interior of the fuel tank 314. Transducers and electrical connectors of the FDM, however, may be disposed external to the fuel tank 314 to avoid submerging of the electronic parts in fuel.

The FDM may be inserted through an opening in a top surface of the fuel tank so that the fuel pump and fuel level float are inside the fuel tank while the electronic components of the FDM protrude outside of the fuel tank. An example of such an arrangement is illustrated in FIG. 4. Therein, a fuel tank 400 is shown with an FDM 402 disposed in a top surface 404 of the fuel tank 400. A set of reference axes 401 are provided for comparison between views.

An opening in the top surface 404 of the fuel tank 400 through which the FDM 402 may be inserted may be sealed with a gasket 406. The FDM may have a planar top surface that is an upper wall 408 of the FDM 402, the planar surface being aligned with (e.g., parallel to) a plane formed by the y and x directions. The upper wall 408 of the FDM 402 may have a circular cross-section, taken along the plane formed by the y and x directions. The gasket 406 is sandwiched between the upper wall 408 and the top surface 404 of the fuel tank 400. The upper wall 408 may be secured in place by an encapsulated ring 410, or E-ring 410, that is embedded in the top surface 404 of the fuel tank 400. The E-ring 410 may have a plurality of tabs 412 that engage an outer rim of the upper wall 408 to lock the upper wall 408 in place.

At least one or more ports 414 may extend upwards, along the "z" direction, from a top surface of the upper wall 408 of the FDM 402. The ports 414 may be support structures to which electrical components such as transducers, wiring, and cables may be fastened and/or enclosed. A cable 416 may be connected to one of the ports 414 to provide a path for electrical signals to be channeled between actuators or sensors, such as a fuel pump controller or a fuel level sensor, and an engine controller, such as controller 212 of FIG. 2. Since the ports 414 may be formed from a brittle material such as plastic, a sudden force imposed on the ports 414 may result in either degradation or detachment of the ports 414 from the upper wall 408 of the FDM 402, rupturing of the upper wall 408 at bases of the ports 414, or disruption of the sealing engagement between the upper wall 408 and the gasket 406. Thus positioning of a barrier to protect the ports 414 from impact may be desirable.

Protection of the ports may be achieved by arranging a protective cover, formed from a rigid, durable material such as steel, over the ports. An example of such a cover is shown in FIGS. 5A-5C. Elements common with those of FIG. 4 are similarly numbered and will not be re-introduced. An example embodiment of a fuel tank 500 is depicted in FIG. 5A with a domed helmet 502 coupled to the E-ring 410 embedded in the top surface 404 of the fuel tank 500. The domed helmet 502 may resemble a domed hat with a curved cap 510, a straight wall 508, and a base 504. The cap 510 and base 504 are generally co-planar while the wall 508 is perpendicular to the plane of the cap 510 and base 504. In one example, the domed helmet 502 may have a uniform thickness of 2.5 mm across all surfaces. In other examples, however, the cap 510 may have a thickness that varies across a surface area of the cap 510, as shown in FIGS. 5B-5C. In addition, the thickness may vary depending on an overall size of the domed helmet 502, e.g., the smaller the size, the thinner the surfaces. In other examples, different surfaces of the domed helmet 502 may have different thicknesses, e.g., the wall 508 may be thicker than the base 504, etc.

Furthermore, the overall thickness of the domed helmet 502, including the cap 510 and the wall 508, may be between 2-3 mm, depending on the type of material used. For example, if the domed helmet 502 is formed from steel, the higher the strength of the steel, the thinner the material of the cap 510 and wall 508 may be. The thickness may be adjusted to provide a desired amount of structural strength according to an anticipated amount of force to be exerted on the domed helmet 502.

The base 504 may be annular and planar, with an inner diameter approximately equal to an outer diameter of the upper wall 408 of the FDM and an outer diameter similar to an outer diameter of the E-ring 410. A planar surface of the base 504 of the domed helmet 502 may be aligned with a plane formed by the "y" and "x" directions. The base 504 may be configured with slots 506 arranged evenly spaced around a circumference of the base 504 to accommodate sliding of the tabs 412 of the E-ring 410 through the slots 506 to secure the domed helmet 502 to the fuel tank 500. The base 504 of the domed helmet 502 may be stacked on top of the E-ring 410.

The wall 508 of the domed helmet 502 may extend linearly and vertically, as defined by the "z" direction, up from an inner circumference of the base 504 to couple the base 504 to a cap 510 of the domed helmet 502. The cap 510 is a curved upper wall of the domed helmet 502 that has a top, outer surface and a bottom, inner surface and at least some portions between the outer and inner surfaces includes a solid layer of material from which the domed helmet 510 is formed. A height of the wall 508 may be less than or equal to a height of the ports 414 of the FDM 402. A top end of the wall 508 may intersect with an outer circumference of the cap 510 at a corner 522 that continues around a circumference of the cap 510.

The cap 510 of the domed helmet 502 may be curved so that a cross-section of the cap 510, taken along a plane formed by the "y" and "z" directions, has a convex shape, as shown in FIG. 5B. A cross-section 550 of the domed helmet 502 is illustrated in FIG. 5B, taken along line A-A' of FIG. 5A that is parallel to the plane formed by the "y" and "z" directions. The cap 510 may have a radius of curvature that is varies across the cap 510, e.g. from a first corner 522a to a second corner 522b. For example, the radius of curvature may be greater at the mid-point 512 than between the mid-point 512 and the corner 522 of the cap 510.

The radius of curvature may vary depending on the dimensions of the components arranged under the domed helmet 502, e.g. a size of the ports 414. However, lower curvatures may result in lesser resistance to descending forces on the protective helmet 502, thus, the radius of curvature may not have an infinite radius (e.g., may not be flat). Increasing the curvature of the cap 510 may therefore increase the resistance of the domed helmet 502 to downward forces but the structural integrity of the domed helmet 502 provided by the curvature may be balanced by an availability of packaging space between the top surface 404 of the fuel tank 500 and vehicle components directly above the fuel tank 500.

Furthermore, a curvature of the cap 510 may be the same as shown in FIG. 5B for any plane taken along the "z" direction, such as a cross-section 570 shown in FIG. 5C, illustrating a cut-away view of the domed helmet 502 taken along line B-B' of FIG. 5A. In the example shown in FIG. 5B, the domed helmet 502 may have an inner diameter (e.g., from corner 522a to corner 522b) across an inner circumferential surface of the planar base, and the radius of curvature may be approximately equal to the inner diameter (e.g., within a threshold range of the inner diameter, such as within 5-10% of the inner diameter). However, other radii of curvature are possible without departing from the scope of the disclosure as long as the radius of curvature is a positive, non-zero value.

A cross-section 570 of the domed helmet 502 is shown FIG. 5C along a plane formed by the "x" and "z" directions. A portion of the cap 510 of the domed helmet 502 extending from approximately a mid-point 512 of the helmet to a third corner 522c is configured similarly as an equivalent portion of the cap 510 in the cross-section 550 of FIG. 5B. The mid-point 512 may be a central point on the cap 510 where a radius of the cap 510, measured from the mid-point 512 to the corner 522, is equal at any point along the circumference of the cap 510 (e.g., along the corner 522). The cross-section 570 includes a region of the domed helmet in which an opening 518 may be positioned.

The opening 518 may provide access to the ports 414 through the domed helmet 502, such as for connecting the cable 414 to one of the ports 414. More than one opening 518 may be included in the domed helmet 502, such as two or three openings. The greater the number of openings, the smaller a size of the openings may be to maintain a minimum amount of surface area of the domed helmet 502 to provide sufficient resistance of the domed helmet 502 to downward forces. However, in comparison with the conventional flat-top helmet, the opening 518 (or openings) may comprise a greater portion of the total surface area of the domed helmet 502 without adversely affecting a structural integrity of the domed helmet 502 and thereby reducing a weight of the domed helmet 502. In particular, an amount of material of the cap 510 directly above the ports 414 of the FDM 402 may be reduced with respect to the traditional flat-top helmet and have a decreased thickness. The one or more openings may represent a portion of a total surface area of the domed helmet 502 that has been removed. For example, a size of the opening 518 of FIGS. 5A and 5C may be 40% of the total surface area of the domed helmet 502. If two openings are included, each opening may represent 20% of the total surface area or a first opening may be 30% and a second opening may be 10% of the total surface area of the domed helmet 502. The opening(s) 518 may have a shape similar to a Reuleaux triangle (e.g., a triangle with curved sides) with respect to the plane formed by the "y" and "x" directions.

Figure 9:
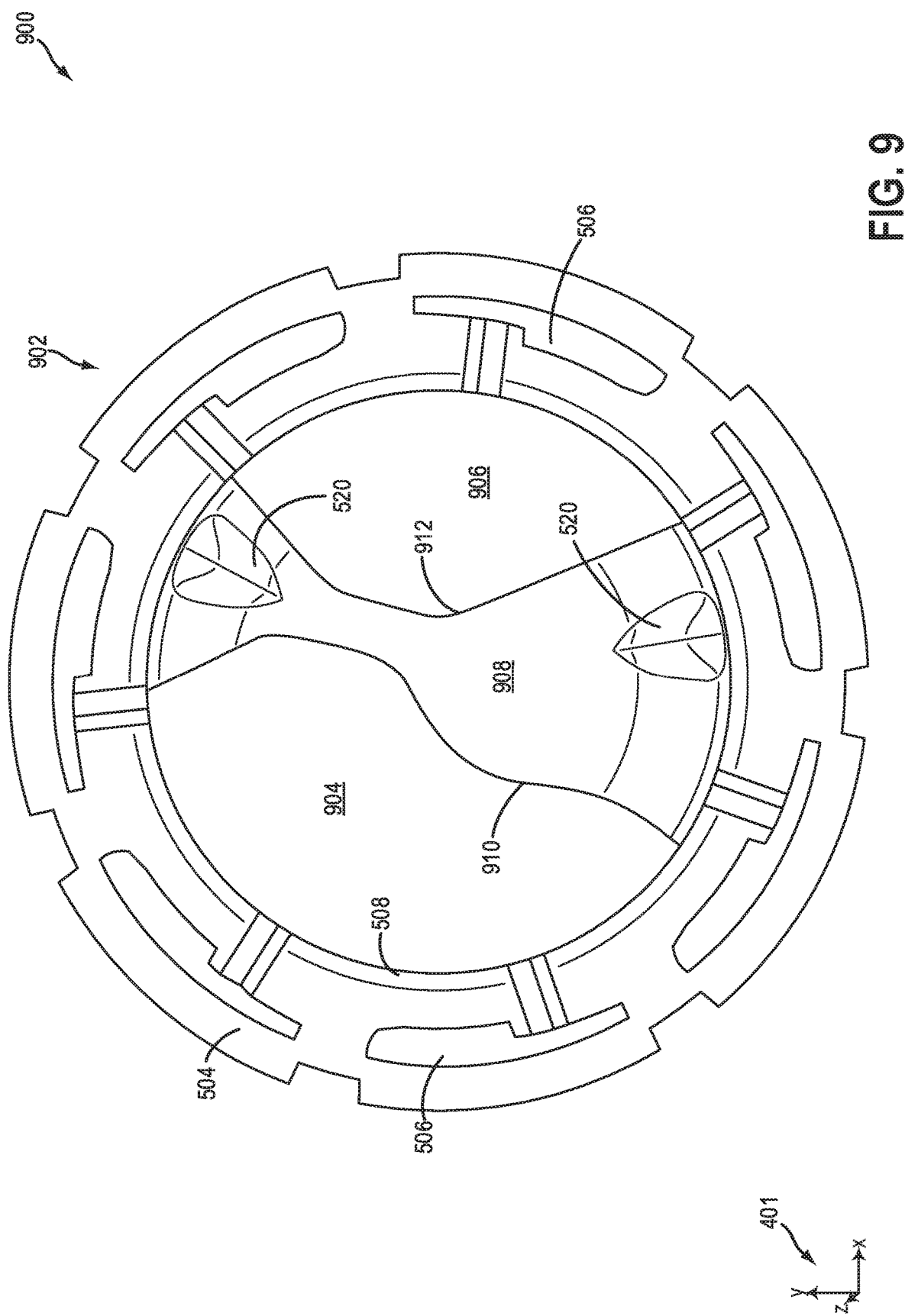
FIG. 9 shows a top-down view of another embodiment of a domed fuel delivery module helmet.

In another embodiment of a domed helmet 902, shown in FIG. 9, the domed helmet 902 may have a first opening 904 and a second opening 906, as shown in a top-down view 900 of FIG. 9. Components similar to those of FIGS. 5A-5C, such as the base 504, slots 506, and darts 520, are similarly numbered. The domed helmet 902 is viewed from directly above in FIG. 9, showing that more than 50% of a cap 908 of the domed helmet 902 is removed due to sizes of the first opening 904 and the second opening 906. A remaining area of the cap 908 may be positioned directly above the ports 414.

The first opening 904 may be larger than the second opening 906 and have a nonlinear, asymmetric wavy edge 910 along the cap 908. In contrast, the second opening 906 may have a straight edge 912 and has a different overall shape than the first opening 904. By incorporating large openings, such as the first and second openings 904, 906 of FIG. 9, in the cap 908 of the domed helmet 902, a weight of the domed helmet 902 may be significantly reduced and access may be provided to the underlying ports.

As shown in FIGS. 5B and 5C, the curvature of the domed helmet 502 may result in the mid-point 512 of the cap 510 having a height 514 that is greater than a height 516 of the wall 508, measured from the planar surface of the upper wall 408 of the FDM 402 to a bottom (inner) face of the cap 510. In addition, a height of the cap 510 at any point of the cap 510 between the mid-point 512 and the corner 522 may be less than the height 514 at the mid-point 512 but greater than the height 516 of the wall 508. In one example, the height 514 at the mid-point 512 of the cap 510 of the domed helmet 502 may be 25 mm while the height 516 of the wall 508 may be 10 mm. In another example, the height 514 at the mid-point 512 of the cap 510 may be 22 mm while the height of the wall 508 may be 15 cm. It will be appreciated that the height of the mid-point 512 of the cap 510 and the height of the wall 508 may vary independently or co-dependently without departing from the scope of the present disclosure. Furthermore, the domed helmet 502 shown in FIGS. 5A-5C is a non-limiting example and other examples of the domed helmet 502 may differ in the number, shapes, and sizes of the one of more openings 518, as shown in FIG. 9.

The domed helmet 502 may also have darts 520 that are interruptions along the corner 522 of the domed helmet 502 where the cap 510 is briefly recessed and angled inwards, towards an interior of the domed helmet 502. A thickness of a material of the domed helmet 502 at the darts 520 may be equal to or slightly thicker than the material of the domed helmet surrounding the darts 520. The darts 520 may act as supporting ribs within an inner surface and inner chamber of the domed helmet 502. A depth of the darts 520 may be between 5-10 mm. The depth of the darts 520 may become increasingly shallow as the darts extend in opposite directions away from the corner 522, along the cap 510 and down the wall 508. The domed helmet may comprise three darts 520 in the example shown but may include other numbers, such as two or four, of darts 520 in other examples.

By adapting the FDM 402 with the domed helmet 502, a curved shape of the protective cover may demonstrate improved resistance to downward forces exerted on the cap 510. A domed structure may be described as an arch that has been rotated on a vertical axis (e.g., the "z" direction) so that the arch forms a three-dimensional surface such as the cap 510 of the domed helmet 502. Arches resolve forces in compressive stresses or loads that may lead to a reduction in volume of the arched (or domed) object in contrast to tensile stresses or loads which lead to increases in a tensile direction, e.g., along a plane of the surface experiencing the forces. The compressive loads are carried downwards through the arch or dome, resulting in an outward pushing, or outward thrust, of a bottom region of the arch or dome. In the example of the domed helmet 502 of FIG. 5, when a downward force is applied to the mid-point 512 of the cap 510, which is a highest point of the domed helmet 502, the force may be converted to a compressive load that is propagated down towards the corner 522 where the cap 510 intersects with the wall 508. The outward thrust of the cap 510 at the corner 522, arising from transfer of the compressive load from the mid-point 512, is resisted by an opposing compressive load generated at the corner 522 and supported by the vertical wall 508. The resistance of the domed helmet 502 to the downward force exerted by the buckled floor is further reinforced by the darts 520, acting as braces to the dome. Furthermore, contact to other regions of the cap 510 of the domed helmet 502, e.g., a point that is not the mid-point 512, or a force that is generally downwards in direction but not parallel with the "z" direction will be similarly absorbed by the generation of compressive loads described above. Thus a likelihood of the domed helmet 502 collapsing and contacting the ports 414 of the FDM 402 is greatly reduced. In addition, the reinforcement of the domed helmet 502 by the darts 520 may allow a thinner material to be used to form the domed helmet 502, decreasing a mass of material used to form the helmet.

An example of how a floor of a cabin (or a trunk) of a vehicle may buckle upon impact to a rear end of the vehicle is shown in FIG. 6. A cross-section 600 includes a floor 602 positioned above the fuel tank 500, spaced away from the fuel tank 500 but in contact with the cap 510 of the domed helmet 502 enclosing the ports 414 of the FDM 402. The domed helmet 502 may be attached to the top surface 404 of the fuel tank 500, surrounding the ports 414 protruding from the upper wall 408 of the FDM 402, and may have a fuel pump 608 positioned inside the fuel tank 500. A bottom surface 604 of the floor 602 is not planar, instead comprising a number of curves and bends. Curving and bending of the bottom surface 604 of the floor 602 results in points of contact 606 between the bottom surface 604 and the cap 510 of the domed helmet 502. As the bottom surface 604 of the floor 602 bends, the bottom surface 604 may strike the cap 510 of the domed helmet 502, exerting a downward force on the domed helmet 502 at the points of contact 606.

Although the points of contact 606 may not be aligned with the mid-point 512 of the cap 510, the domed structure of the domed helmet 502 propagates the force as a compressive load to the corner 522 of the domed helmet 502 where it is met by an opposing compressive load, as described above. The wall 508 is supported and held in place by the base 504, maintaining a fixed circumference of the wall 508.

The configuration of the domed helmet 502 may reduce a likelihood of contact between cap 510 of the domed helmet 502 at the mid-point 512 of the cap 510 even when the force exerted downwards on the upper surface results in a deformation of the domed helmet 502 that decreases the height 514 of the domed helmet 502 at the midpoint 512 of the cap 510. A resistance of the domed helmet 502 to the force may allow the domed helmet 502 to maintain a gap between tops of the ports 414 and the cap 510 even after impact from the bottom surface 604 of the floor 602. As an example, a gap of 5 mm between the tops of the ports 414 and the cap 510 even after deformation of the domed helmet 502 may be desired.

The curved shape of the domed helmet 502 may have the additional effect of reducing a velocity of the floor 602 when the floor is in motion, e.g. buckling or wrinkling. The domed helmet 502 may have a higher probability of contact with the floor 602, as shown in FIG. 6, in comparison with a conventional flat-top helmet due to an increased height at the mid-point 512 of the cap 510 of the domed helmet 502. Friction between the domed helmet 502 and the floor generates resistant forces that lowers the intrusion and strain imposed on the fuel tank 500 by converting shear forces into compressive forces resulting from the curvature of the domed helmet 502. The relative velocity of the moving floor and its force of impact is thus decreased.

FIGS. 1-6 and 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

Figure 7:
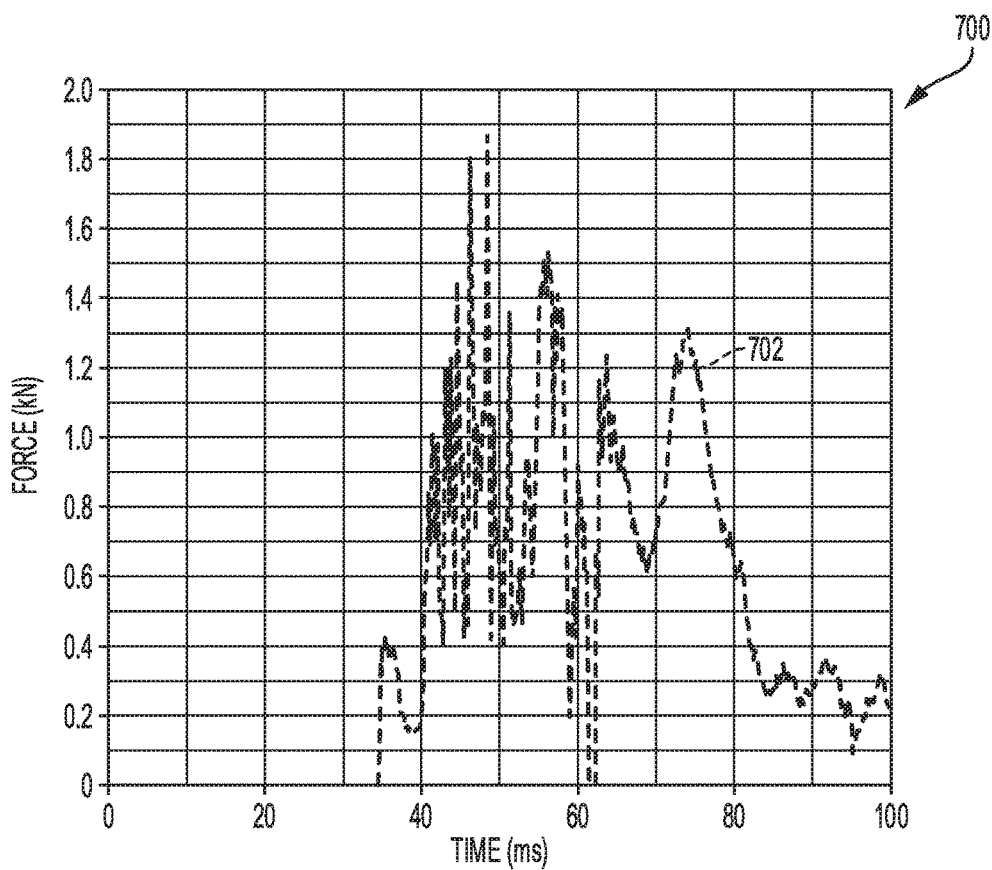
FIG. 7 shows a prophetic plot of a downward force exerted on a fuel delivery module helmet as a function of time.
Figure 8:
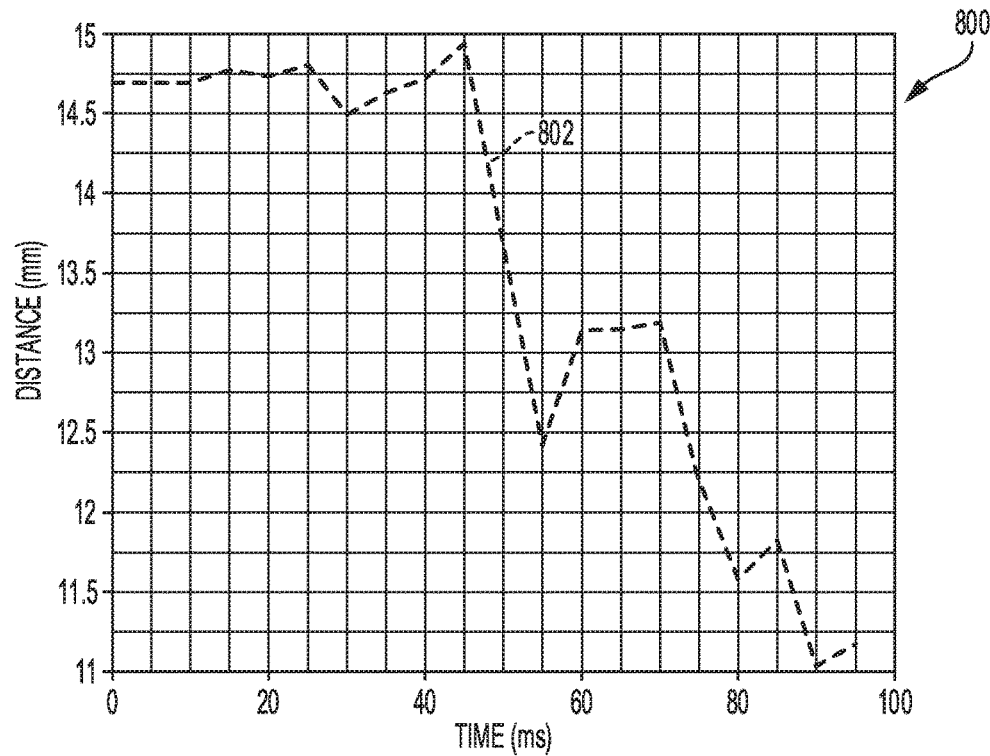
FIG. 8 shows a prophetic plot of a distance between an upper surface of a fuel delivery module helmet and a highest point of a fuel delivery module port as a function of time.

Turning now to FIGS. 7 and 8, prophetic data depicting a force exerted on a domed helmet, such as the domed helmet 502 of FIGS. 5-6, during an event causing an object, such as the floor 602 of FIG. 6, to move and collide with the domed helmet is shown in graph 700. Graph 700 depicts a plot 702 of the force, in kilonewtons, experienced by an upper surface of the domed helmet over time, in milliseconds. Graph 800 shows prophetic data for a distance, or gap, between a bottom face of the upper surface of the domed helmet and top surfaces of FDM ports, such as the ports 414 of FIGS. 4-6, measured in millimeters as a function of time, in milliseconds. Plot 802 of graph 800 shows a change in the distance during the same event of FIG. 7, resulting from exertion of a force on the domed helmet that causes deformation of the domed helmet. A scale of the x-axis of FIG. 7 is the same for the x-axis of FIG. 8 to allow direct comparison between graphs 700 and 800.

At 0 ms, no force is applied to the domed helmet (plot 702) while the distance between the bottom face of the upper surface of the domed helmet and the tops of the FDM ports is approximately 14.7 mm (plot 802). At 35 ms, an event occurs that leads to application of a force to the domed helmet of about 0.4 kN. Between 35-45 ms, the force increases, at some moments reaching 1.8 kN. At 45 ms, the force exerted on the domed helmet is sufficiently high to initiate deformation of the domed helmet and the distance between the upper surface of the domed helmet and the tops of the FDM ports begins to decrease.

Between 45-80 ms, the force is maintained on the domed helmet and the decrease in distance between the upper surface of the domed helmet and the FDM ports continues to decrease. The force is diminished at 80 ms and remains below 0.4 kN thereafter. The distance, however, continues decreasing to a minimum at 90 ms of 11 mm, resulting in a final distance of 11 mm after a large portion of the downward pressure has been released.

The prophetic data of FIGS. 7 and 8 show an approximately 25% reduction in the distance between the inner face of the upper surface of the domed helmet and the tops of the FDM ports. An 11 mm gap is maintained after impact even though the initial distance (14.7 mm) is less than a recommended clearance of 30 mm.

In this way a domed helmet, relying on compressive strength rather than tensile strength, may provide sufficient resistance, in spite of a small amount of deformation, to protect external fuel delivery module (FDM) components protruding from a fuel tank. Less material may be used to form the domed helmet in comparison to a conventional flat-topped helmet configured to provide an equivalent amount of final clearance between the domed helmet and the FDM ports after deformation of the domed helmet. Thus the domed helmet may reduce packaging requirements of the fuel tank as well as system costs and weight. Furthermore, the domed helmet may interact with a moving vehicle component to slow a velocity of the component and its force of impact with the domed helmet or another object.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As one embodiment, a fuel system includes a fuel tank, a fuel delivery module, a portion of the fuel delivery module positioned inside the fuel tank and one or more electronic ports of the fuel delivery module arranged outside of the fuel tank and protruding from a top surface of the fuel tank, and a protective cover surrounding the one or more electronic ports of the fuel delivery module and spaced away from the one or more electronic ports, the protective cover having a domed cap. In a first example of the fuel system, the protective cover is tallest at a mid-point of the domed cap and wherein the mid-point is a central point of the domed cap so that a radius of the domed cap extending from the mid-point to an outer circumference of the domed cap is uniform at any point along the outer circumference. A second example of the fuel system optionally includes the first example and further includes wherein the protective cover has a straight vertical wall coupling the domed cap to a planar base. A third example of the fuel system optionally includes one or more of the first and second examples, and further includes wherein the planar base includes slots configured to secure the protective cover to the top surface of the fuel tank by positioning tabs of an encapsulating ring embedded in the top surface fuel tank through the slots of the planar base. A fourth example of the fuel system optionally includes one or more of the first through third examples, and further includes wherein the protective cover has one or more openings to allow access to the one or more electronic ports. A fifth example of the fuel system optionally includes one or more of the first through fourth examples, and further includes, wherein the domed cap includes one or more darts that increase a resistance of the protective cover to downward forces exerted on the protective cover. A sixth example of the fuel system optionally includes one or more of the first through fifth examples, and further includes, wherein the hybrid vehicle includes an engine and an electric motor and the hybrid vehicle is configured to be propelled by the engine and the electric motor, the fuel tank delivery module configured to supply fuel to the engine. A seventh example of the fuel system optionally includes one or more of the first through sixth examples, and further includes, wherein the fuel tank is positioned directly under a floor of the hybrid vehicle.

As another embodiment, a protective cover includes a domed cap, a planar base, and a straight vertical wall coupling the domed cap to the planar base, the domed cap configured to cover the one or more ports of the fuel delivery module when the protective cover is coupled to the fuel delivery module, and the planar base includes a plurality of slots configured to engage respective complementary tabs on the fuel delivery module. In a first example of the protective cover, wherein a height of the domed cap at a central point of the domed cap is taller than the straight vertical wall. A second example of the protective cover optionally includes the first example, and further includes wherein a height of the domed cap at any point along the domed cap between the central point and the straight vertical wall is less than the height at the central point and greater than a height of the straight vertical wall. A third example of the protective cover optionally includes one or more of the first and second examples and further includes wherein the domed cap comprises one or more darts arranged around a circumference of the domed cap. A fourth example of the protective cover optionally includes one or more of the first through third examples, and further includes, wherein the domed cap comprises one or more openings that represent removal of up to 40% of a surface area of the domed cap. A fifth example of the protective cover optionally includes one or more of the first through fourth examples, and further includes, wherein the one or more openings has a shape similar to a Reuleaux triangle. A sixth example of the protective cover optionally includes one or more of the first through fifth examples, and further includes, wherein a radius of curvature of the domed cap varies across the domed cap. A seventh example of the protective cover optionally includes one or more of the first through sixth examples, and further includes, where the radius of curvature comprises non-zero positive values.

As another embodiment, a fuel delivery system includes a fuel delivery module comprising a fuel pump configured to be positioned in a fuel tank, the fuel delivery module including one or more electronic ports arranged on a top surface of the fuel delivery module, and a protective cover coupled to the top surface of the fuel delivery module, the protective cover comprising a domed cap, a planar base, and a straight vertical wall coupling the domed cap to the planar base, the domed cap configured to cover the one or more electronic ports of the fuel delivery module. In a first example of the fuel delivery system, the planar base is circumferential and has an inner diameter, and wherein a radius of curvature of the domed cap is within a threshold range of the inner diameter. A second example of the fuel delivery system optionally includes the first example and further includes wherein the domed cap comprises one or more darts arranged around a circumference of the domed cap. A third example of the fuel delivery system optionally includes one or more of the first and second examples, and further includes, wherein the domed cap includes one or more openings.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle, comprising:
an engine;
a motor, the engine and the motor each positioned at a front end of the hybrid vehicle;
a battery pack coupled to the motor, the battery pack positioned at a rear end of the hybrid vehicle;
a fuel tank with a fuel delivery module at least partially therein, the fuel tank positioned below the battery pack at the rear end of the hybrid vehicle, one or more electronic ports of the fuel delivery module arranged outside of the fuel tank and protruding from a top surface of the fuel tank; and
a protective cover surrounding the one or more electronic ports of the fuel delivery module and spaced away from the one or more electronic ports, the protective cover having a domed cap coupled to a straight vertical wall, a height of the domed cap at any point along the domed cap between a central point of the domed cap and the straight vertical wall being less than the height at the central point and greater than a height of the straight vertical wall,
wherein a floor of the hybrid vehicle at the rear end of the hybrid vehicle is configured to contact the domed cap at one or more contact points of the domed cap during select conditions, and the domed cap is configured to propagate downward forces exerted at the one or more contact points as a compressive load to a corner where the domed cap couples to the straight vertical wall.

2. The hybrid vehicle of claim 1, wherein a radius of the domed cap extending from the central point to an outer circumference of the domed cap is uniform at any point along the outer circumference, and wherein the straight vertical wall couples the domed cap to a planar base.

3. The hybrid vehicle of claim 2, wherein during the select conditions, the domed cap is configured to deform when the downward forces are exerted on the one or more contact points such that an inner surface of the domed cap changes from being spaced away from the one or more electronic ports by 14-15 mm to being spaced away from the one or more electronic ports by at least 10 mm.

4. The hybrid vehicle of claim 3, wherein the planar base includes slots configured to secure the protective cover to the top surface of the fuel tank by positioning tabs of an encapsulating ring embedded in the top surface of the fuel tank through the slots of the planar base.

5. The hybrid vehicle of claim 2, wherein the protective cover has one or more openings to allow access to the one or more electronic ports.

6. The hybrid vehicle of claim 2, wherein the domed cap includes one or more darts that increase a resistance of the protective cover to downward forces exerted on the protective cover.

7. The hybrid vehicle of claim 1, wherein the hybrid vehicle is configured to be propelled by the engine and the electric motor, the fuel delivery module configured to supply fuel to the engine.

8. The hybrid vehicle of claim 1, wherein the select conditions include the hybrid vehicle undergoing a rear impact, and wherein the one or more contact points include at least one contact point that is not aligned with the central point.

9. A protective cover configured to cover one or more ports of a fuel delivery module coupled to a fuel tank configured to supply fuel to an engine of a vehicle, the protective cover comprising:
a domed cap;

a planar base; and a straight vertical wall coupling the domed cap to the planar base, the domed cap configured to cover the one or more ports of the fuel delivery module when the protective cover is coupled to the fuel delivery module, and the planar base includes a plurality of slots configured to engage respective complementary tabs on the fuel delivery module, wherein a height of the domed cap at a central point of the domed cap is in a range of 20-25 mm.

10. The protective cover of claim 9, wherein a height of the straight vertical wall is in a range of 10-15 mm.

11. The protective cover of claim 9, wherein a height of the domed cap at any point along the domed cap between the central point and the straight vertical wall is less than the height at the central point and greater than a height of the straight vertical wall.

12. The protective cover of claim 9, wherein the domed cap comprises one or more darts arranged around a circumference of the domed cap.

13. The protective cover of claim 9, wherein the domed cap comprises one or more openings that represent removal of up to 40% of a surface area of the domed cap.

14. The protective cover of claim 13, wherein the one or more openings has a shape similar to a Reuleaux triangle.

15. The protective cover of claim 9, wherein a radius of curvature of the domed cap varies across the domed cap and where each radius of curvature comprises a non-zero positive value.

16. The protective cover of claim 9, wherein the domed cap has a cross-sectional thickness of 2-3 mm.

17. A fuel delivery system for a vehicle, comprising:

a fuel delivery module comprising a fuel pump configured to be positioned in a fuel tank coupled directly under a floor of the vehicle, the fuel delivery module including one or more electronic ports arranged on a top surface of the fuel delivery module; and a protective cover coupled to the top surface of the fuel delivery module, the protective cover comprising a domed cap, a planar base, and a straight vertical wall coupling the domed cap to the planar base via an outer circumference of the domed cap, the domed cap configured to cover the one or more electronic ports of the fuel delivery module, the domed cap having a central point and curving from the outer circumference to the central point with one or more radii of curvatures each having a non-zero positive value, wherein a clearance of 10-15 mm between an inner surface of the domed cap and the one or more electronic ports is maintained even when a downward force is exerted on the domed cap by the floor of the vehicle.

18. The fuel delivery system of claim 17, wherein the planar base is circumferential and has an inner diameter, and wherein a radius of curvature of the domed cap is within a threshold range of the inner diameter.

19. The fuel delivery system of claim 17, wherein the domed cap comprises one or more darts arranged around a circumference of the domed cap.

20. The fuel delivery system of claim 17, wherein the domed cap includes one or more openings.

* * * * *